*(12)* United States Patent
Laurino (10) Patent No.: US 10,685,478 B1
(45) Date of Patent: Jun. 16, 2020

(54) MITIGATING PROJECTOR GLARE BY REAL-TIME DYNAMIC SHADOW MASKING

(71) Applicant: KILBURN LIVE, LLC, Los Angeles, CA (US)

(72) Inventor: Joseph Ygona Laurino, Sammamish, WA (US)

(73) Assignee: KILBURN LIVE, LLC, Los Angeles, CA (US)

( * ) Notice: Subject to any disclaimer, the term of this patent is extended or adjusted under 35 U.S.C. 154(b) by 0 days.

(21) Appl. No.: 16/009,092

(22) Filed: Jun. 14, 2018

(51) Int. Cl.
| | | |
|---|---|---|
| *A63F 9/00* | (2006.01) | |
| *G06T 15/60* | (2006.01) | |
| *G06T 15/50* | (2011.01) | |
| *G06F 3/01* | (2006.01) | |
| *A63F 13/27* | (2014.01) | |
| *H04N 9/31* | (2006.01) | |
| *G06T 7/50* | (2017.01) | |

(52) U.S. Cl.
CPC .............. *G06T 15/60* (2013.01); *A63F 13/27* (2014.09); *G06F 3/013* (2013.01); *G06T 15/506* (2013.01); *H04N 9/3179* (2013.01); *G06T 7/50* (2017.01)

(58) Field of Classification Search
None
See application file for complete search history.

(56) References Cited

U.S. PATENT DOCUMENTS

| | | | | |
|---|---|---|---|---|
| 7,984,995 B2* | 7/2011 | Morrison | ............... | G03B 21/14 353/121 |
| 9,268,520 B1* | 2/2016 | Cederlof | .................... | G06F 3/16 |
| 10,027,934 B1* | 7/2018 | Moore, Jr. | ......... | G06K 9/00228 |
| 10,127,733 B2* | 11/2018 | Soon-Shiong | ........ | G06T 19/006 |
| 2004/0165154 A1* | 8/2004 | Kobori | .................. | G03B 21/26 353/69 |
| 2006/0170871 A1* | 8/2006 | Dietz | ..................... | G03B 21/14 353/31 |
| 2008/0239250 A1* | 10/2008 | Jose | ........................ | G03B 17/54 353/88 |
| 2010/0177929 A1* | 7/2010 | Kurtz | ................. | G06K 9/00228 382/103 |
| 2010/0321389 A1* | 12/2010 | Gay | ..................... | G11B 27/036 345/427 |

* cited by examiner

*Primary Examiner* — Seng H Lim
(74) *Attorney, Agent, or Firm* — Sheppard, Mullin, Richter & Hampton LLP (57) ABSTRACT

A location associated with an individual at least partially located between a projector and a projection surface is determined. A portion of an image to be projected by the projector onto the projection surface is modified. As a result of the image including the portion modified being provided to the projector, projection of the portion of the image modified is caused to intersect with the location associated with the individual.

20 Claims, 8 Drawing Sheets

MITIGATING PROJECTOR GLARE BY REAL-TIME DYNAMIC SHADOW MASKING

BACKGROUND

A person in the path of projection between a projector and a projection surface can be subjected to painful glare if he or she looks in the direction of the image projector from the light shining through the projector lens. This issue can be exacerbated in immersive, mixed reality environments that use one or more image projectors because the glare interferes with a suspension of disbelief by the viewing participant and detracts from the viewer's immersive, mixed reality experience. Furthermore, if the viewing participant is in the path of projection, part of the projected image is often projected onto the viewer's body, which, if not deliberate, can further interrupt the suspension of disbelief of the viewing participant as well as other viewing participants who observe the projection on the viewing participant's body.

BRIEF DESCRIPTION OF THE DRAWINGS

Various techniques will be described with reference to the drawings, in which.

DETAILED DESCRIPTION

Techniques and systems described below relate to improving viewer experience in an image projection through the use of a mask overlay on an image being projected. In one example, data sufficient to represent at least part of a three-dimensional environment in virtual space is obtained, with coordinates in the three-dimensional environment having a correspondence to coordinates in a physical environment in a physical space. In the example, a virtual light source in the three-dimensional environment is associated with a projector in the physical environment, with the physical environment including a projection surface. Also in the example, a physical location of an eye of an individual in the physical environment is determined based on sensor data from a sensor in the physical space, with the individual being in the path of projection of the projector.

Further in the example, a virtual location in the three-dimensional environment is associated with the physical location. Also in the example, a shadow of the virtual object at a location in the three-dimensional environment that corresponds to the projection surface in the physical environment is determined based on a virtual object at the virtual location blocking at least a portion of the virtual light source. Likewise, in the example, an image of the three-dimensional environment is generated, with a portion of the image corresponding to the shadow. Lastly in the example, the projector is caused to project the image onto the individual and the projection surface such that the portion of the view that corresponds to the shadow is projected onto the eye of the individual.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of mixed reality, by preventing portions of a projected image from being projected onto viewing participants at least partially located in a path of projection between a projector and a projection surface. Additionally, techniques described and suggested in the present disclosure can be used to accurately determine where to place a shadow mask into an image of a virtual reality environment being displayed on the projection surface by determining a location in the virtual reality environment that corresponds to the viewing participant in the physical space and determining a shadow in the virtual environment that would be cast by a virtual object in the location blocking light emitted from a virtual light source in the virtual environment that corresponds to the projector in the physical space. Moreover, techniques described and suggested in the present disclosure are usable to overcome the problem of viewer discomfort caused by glare of light shining from a lens of the projector into the eyes of the viewer in the path of projection.

Figure 1:
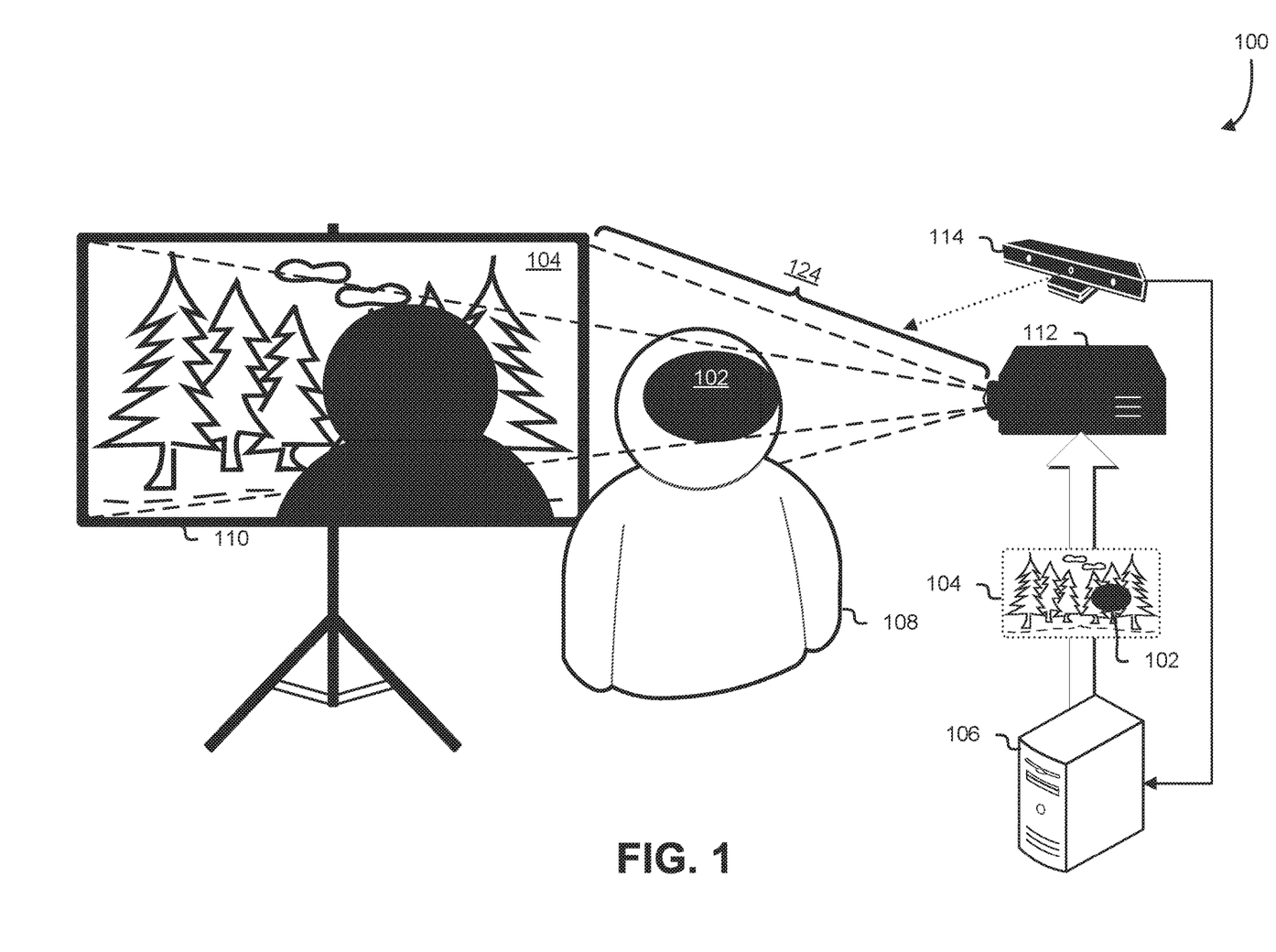
FIG. 1 illustrates an example of a system for projecting a mask in accordance with an embodiment.

FIG. 1 illustrates an aspect of an environment 100 in which an embodiment may be practiced. As illustrated in FIG. 1, the environment 100 may include a computing system 106 that receives information from a sensor 114 relating to a position and/or orientation of an individual 108 in a path of projection 124 by a projector 112 to a projection surface 110. The computing system 106 determines the portion of an image 104 that would be projected onto a portion (e.g., the eyes) of the individual 108 and overlays the image 104 to be sent to the projector 112 with a mask 102 (e.g., a black oval) such that the mask 102 is projected onto the portion of the individual.

In an embodiment, the projection surface 110 is a surface used for displaying a projected image for view by one or more individuals. Although the projection surface 110 depicted in FIG. 1 is illustrated to be on a stand, it is contemplated that the projection surface 110 may be permanently installed, may be portable (e.g., tripod, floor-rising, ceiling rising, etc.), may be a wall, may be fabric, may be inflatable, or may be opaque or translucent. The projection surface 110 may be any of a variety of colors, such as white, gray, or beige, depending on implementation. Likewise, the reflectivity and texture of the projection surface 110 may vary by implementation depending on factors such as ambient light level and luminous power of the projector 112. It is contemplated that the techniques described in the present disclosure may be applied to projection surface shapes, such as flat (i.e., non-curved), curved, or dome-shaped. It is further contemplated that, in some embodiments, the projection surface 110 is designed to reflect light projected onto the projection surface 110 (front projection).

In an embodiment, the projector 112 may be an optical device that projects an image or moving images, such as the image 104, onto a surface such as the projection surface 110. In some embodiments, the projector 112 projects an image by shining a light through a lens. In other embodiments, the projector 112 projects the image using one or more lasers. In some implementations, the projector 112 projects onto the projection surface 110 from the front. In other implementations, the projector 112 additionally includes mirrors and/or beam splitters. It is contemplated that the projector 112 may utilize any of a variety of projection technologies, including cathode ray tube (CRT) projection, Digital Light Processing (DLP) projection, liquid crystal display (LCD) projection, liquid crystal on silicon (LCOS), or laser video projection.

In an embodiment, the sensor 114 comprises one or more sensors usable, from collected sensor data, to perform range imaging to determine a distance (e.g., depth) and/or shape of an object, such as the individual 108, from data obtained from the sensor 114. That is, in some embodiments, the sensor is a depth sensor that uses one or more of a variety of techniques, such as stereo triangulation, sheet of light triangulation, structured light, time-of-flight (TOF), interferometry, blob detection, or coded aperture, to determine a distance and/or shape of an object. In some embodiments, the sensor 114 utilizes stereo triangulation to determine the depth of an object based on data acquired using multiple image capture devices in the sensor 114. In other embodiments, the sensor 114 uses time-of-flight (ToF) to determine depth and/or shape of an object from the sensor 114. In an embodiment, the sensor 114 utilizes a structured three-dimensional scanner that measures three-dimensional shapes of objects using projected light patterns and a camera system. In embodiments, the sensor 114 uses radio waves (e.g., radar) to determine range, angle, and/or velocity of an object. In embodiments, the sensor 114 uses light detection and ranging (Lidar) to determine depth. In other embodiments, the sensor 114 is one or more image capture devices that capture images of the environment 100 from which distance to the individual 108 can be determined, such as using depth of field data (e.g., amount of blurring indicating a distance from the plane of focus) or parallax (e.g., displacement of objects between two stereo images).

In still other embodiments, the sensor 114 is located (not shown) on the individual 108 and is capable of actively or passively providing information to the computing system 106 about the location of the individual 108. Examples of the sensor 114 include a three-dimensional scanner, a laser rangefinder, a ToF camera, the Microsoft Kinect™, and SoftKinetic Iisu™.

In an embodiment, the projector 112 and sensor 114 are communicatively coupled, such as through a network, direct cable, or wireless connection, to the computing system 106. The computing system 106 receives signals from the sensor 114 from which the position and/or orientation of at least a portion (e.g., head) of the individual 108 relative to the sensor 114 can be determined (e.g., depth of a portion of the individual 108 to the sensor 114). In some embodiments, the sensor 114 includes software and/or hardware that executes to determine the distance and/or orientation of the individual 108, and this information is provided to the computing system 106. In other embodiments, the sensor 114 provides sensor data to the computing system 106, whereupon the sensor data is processed by software executing on the computing system 106 to determine the distance and/or orientation of the individual 108 relative to the sensor 114. In some embodiments, the projector 112 and the sensor 114 are integrated into a single device, such that the position and/or orientation of portions of the individual 108 relative to the sensor 114 are simultaneously the position and/or orientation of the portions of the individual 108 relative to the projector 112.

In an embodiment, the computing system 106 is one or more computer systems configured with executable instructions and/or other data that, upon execution of the executable instructions by one or more processors, causes the computing system 106 to perform the operations of receiving sensor data from the sensor 114, obtaining the image 104, generating and overlaying the mask 102, and sending the image 104 (with the mask 102) to the projector 112 to be projected. The computing system may be one or more of any suitable computing devices, including a server in a data center (e.g., one of the one or more application servers 808 of FIG. 8), by multiple computing devices in a distributed system of a computing resource service provider, or by any electronic client device such as the electronic client device 802.

In embodiments, the computing system 106 has information indicating the position and/or orientation of the projector 112 relative to the sensor 114. Using this information, the computing system 106 is capable of computing the position and/or orientation of portions of the individual 108 relative to the projector 112. Furthermore, in some embodiments the computing system 106 has information indicating the position of the projection surface 110 relative to the projector 112. From this information, and the position and/or orientation of the portions of the individual 108, the computing system is capable of determining which portions of the image 104 will be projected onto the individual 108. From this information, the computing system 106 computes a location within the image 104 to overlay the mask 102 such that the mask projects onto the portions of the individual sensed by the sensor 114.

In an embodiment, the mask 102 is a set of pixels (e.g., a graphic and/or shape) that is overlaid onto or otherwise integrated into the image 104 at the location, upon being projected, would be projected onto the individual 108. In some examples, the shape of the actual projection of such set of pixels onto the individual 108 may also be referred to as the mask 102. In some embodiments, the mask is a dark shape (e.g., black oval) designed to reduce the glare to the individual 108 from the projector by masking out light that would have otherwise been projected onto the eyes of the individual 108. Because the individual 108 is blocking the projection to the projection surface 110 anyway, the mask 102 may not affect the projection on the projection surface 110. It is contemplated that, depending upon the accuracy of the sensor 114 and the computation of the position and orientation of the individual 108 relative to the projector 112, that the mask 102 may be a plurality of masks (e.g., one small oval/circle for each eye).

It is further contemplated that in some embodiments, the mask 102 may include graphics to overlay onto portions of the individual 108. For example, additionally or alternatively to blocking out light from the eyes of the individual 108, the mask 102 may comprise a graphical design (e.g., such as a design intended to look like a tattoo, body paint, facial hair, a bug, an article of clothing such as a uniform or badge, etc.) to be projected by the projector 112 onto the face or other part of the body of the individual 108. As another example, if the individual 108 is using the computing system 106, sensor 114, and projector 112 to play an interactive video game, the mask could be a graphic projected onto the body of the individual to portray damage (e.g., wounds) experienced by the individual's video game character.

In an embodiment, the image 104 may be a numeric (e.g., binary) representation of a two-dimensional image that comprises a set of picture elements (pixels). The image 104 may contain a fixed number of rows and columns of pixels having values that represent the hue and/or brightness at that specific point. The image 104 may be formatted according to a specific image format, such as Graphics Interchange Format (GIF), Joint Photographic Experts Group (JPEG), Portable Network Graphics (PNG), bitmap (BMP), or Tagged Image File Format (TIFF). In some implementations, the image 104 is a computer-generated image, such as of a scene in a virtual reality environment. In other implementations, the image 104 is an image frame of a sequence of image frames comprising a video. In embodiments, the mask 102 is overlaid on each image frame at the location that would be projected on the portion of the individual 108 for as long as the sensor 114 in combination with the computing system 106 determines that the individual 108 is in the path of the projection from the projector 112. In some implementations, the mask 102 is overlaid on only some of the image frames (e.g., every other one), such as in the case of a mask that is intended to reduce, but not necessarily eliminate, projector glare in the eyes of the individual 108.

In an embodiment, the individual 108 is a human being in the path of projection 124 by the projector 112 to the projection surface 110. It is contemplated that there may be multiple individuals in the path of projection 124, and the computing system 106 may generate a separate mask for each of the individuals. It is also contemplated that the individual 108 may be a non-human animal (e.g., a dog, a cat, etc.). It is also contemplated that the mask 102 may be generated to mask out as much of the body of the individual as the sensor 114 detects. For example, in an immersive, mixed reality environment, projecting onto the body of the individual may detract from the immersive experience for the individual 108; by avoiding projecting onto parts of the body of the individual, the immersive experience may be improved. In a similar way, the individual may be a non-human object that likewise lies in the path of projection 124 (e.g., a physical table, chair, etc.); by avoiding projecting onto the object, the immersive experience may be improved.

Figure 2:
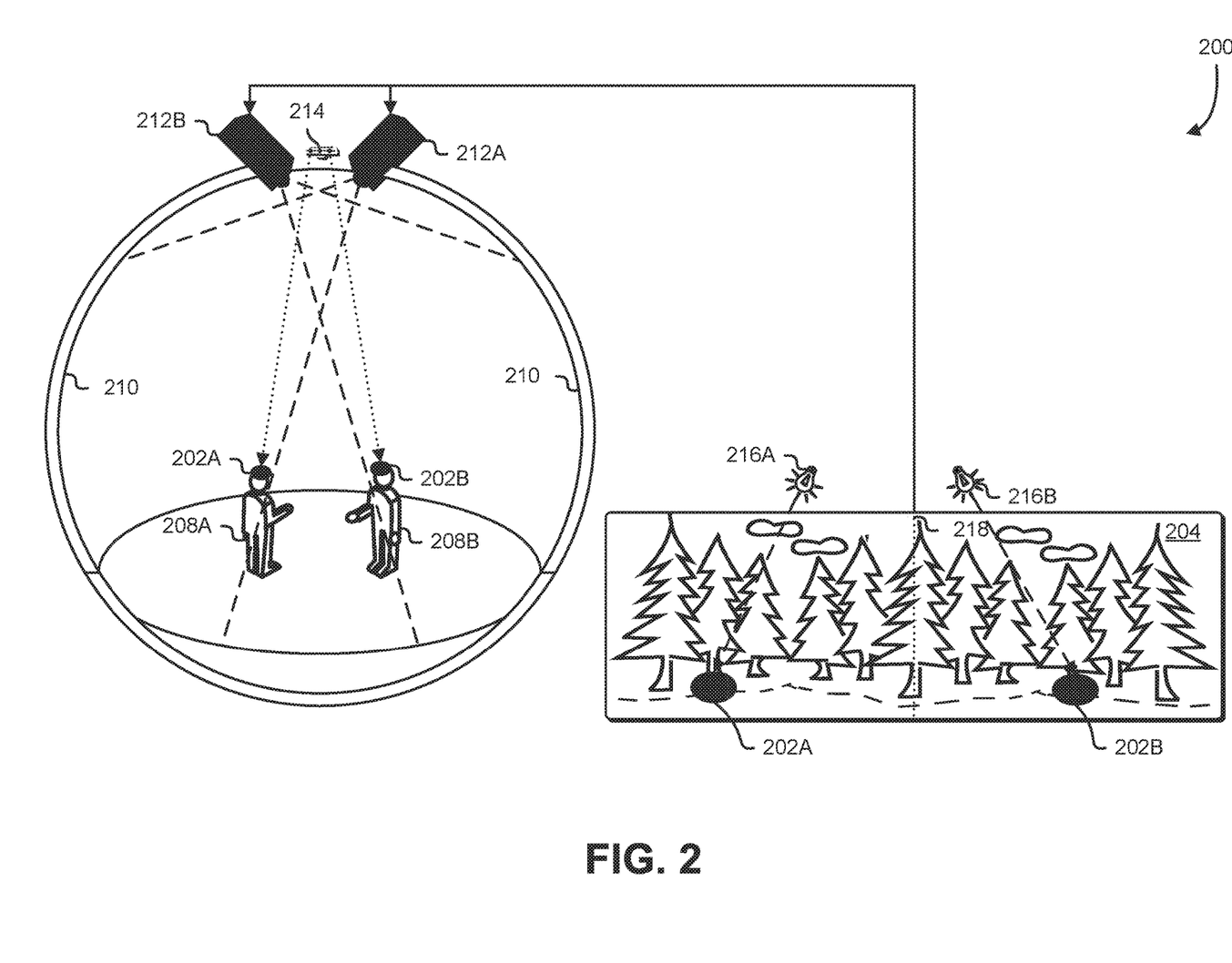
FIG. 2 illustrates an example of a system for projecting a mask in an immersive environment in accordance with an embodiment.

FIG. 2 illustrates another aspect of an environment 200 in which an embodiment may be practiced. As illustrated in FIG. 2, the environment 200 may include one or more individuals 208A-08B within an enclosure having a dome-shaped projection surface 210 upon which a plurality of projectors 212A-12B project an image 204 that includes one or more masks 202A-02B that correspond to the one or more individuals 208A-08B.

In an embodiment, the one or more masks 202A-02B are each similar to the mask 102 described in conjunction with FIG. 1. That is, the mask 202A is a mask overlaid in the image 104 such that the mask 202A intersects with the individual 208A in the projection by the projector 212A. Likewise, the mask 202B is a mask overlaid in the image such that the mask 202B intersects with the individual 208B in the projection by the projector 212B.

In an embodiment, the image 204 is similar to the image 104 of FIG. 1 except that it is designed to be projected onto the dome-shaped projection surface 210 in order to subject the one or more individuals 208A-08B to an immersive, mixed reality experience. The image 204 may be an image frame of a computer animation (e.g., view of a virtual reality environment), live capture video stream, recorded video, or a composited scene.

In an embodiment, the one or more individuals 208 are each similar to the individual 108 described in conjunction with FIG. 1. In the embodiment, the one or more individuals are viewing and/or interacting with the immersive projection onto the dome-shaped projection surface 210. For example, the one or more individuals 208A-08B may be playing a cooperative, immersive video game projected onto the dome-shaped projection surface 210. As another example, the one or more individuals may be viewing a 360-degree video recorded using an omnidirectional camera or collection of cameras.

Note, in the illustrative example depicted in FIG. 2 that a first individual 208A intersects with the projection of the image 204 by the projector 212A, but does not intersect with the projection of the image 204 by the projector 212B. Conversely, a second individual 208B intersects with the projection of the image 204 by the projector 212B, but does not intersect with the projection of the image 204 by the projector 212A.

In an embodiment, the dome-shaped projection surface 210 is a projection surface of a dome-based video projection environment, such as a fulldome. Although the projection surface depicted in FIG. 2 is dome-shaped, it is contemplated that the techniques of the present disclosure may be applied to any type of projection surface, such as, for example a flat projection screen or a curved projection screen. It is contemplated that curved projection screens include semi-circular, cylindrical, and dome-shaped projection screens.

In an embodiment, the plurality of projectors 212A-12B are each similar to the projector 112 of FIG. 1. It is contemplated that techniques of the present disclosure are applicable for any number of projectors (e.g., one, four, six, etc.). For example, a single projector having a wide-angle lens (e.g., fisheye lens) may be sufficient to project the image 204 onto the entire dome-shaped projection surface, in which case only one of the projectors 212A-12B is present in the environment 200. In implementations of multiple projectors, each of the plurality of projectors 212A-12B projects a segment of the image 204 onto a segment of the projection surface. For example, the plurality of projectors 212A-12B may each project side-by-side segments of the image 204 to create a view that seamlessly covers the dome-shaped projection surface 210.

In an embodiment, the sensor 214 is similar to the sensor 114 of FIG. 1. In some embodiments, only one sensor 214 is utilized, whereas in other embodiments multiple sensors are utilized (e.g., a sensor for each of the plurality of projectors 212A-12B). The sensor 214 may be used to detect the position and/or orientation of the one or more individuals 208A relative to each of the plurality of projectors 212A-12B.

As described in FIG. 1, a computer system (not depicted in FIG. 2) may determine, based on data obtained from the sensor 214, where within the image 204 the one or more masks 202A-02B should be overlaid in order to intersect with the appropriate portion of corresponding individual of the one or more individuals 208A-08B. The determination may be made by determining where in the image 204 that a shadow of the portion of the corresponding individual created by the virtual light sources 216A-16B would fall.

In an embodiment, the virtual light sources 216A-16B are points in a virtual environment that are mapped to correspond to the projectors 212A-12B in the physical space associated with the dome-shaped projection surface 210. The locations of the one or more individuals 208A-08B in the physical space may also be mapped to locations in the virtual environment such that the system of the present disclosure can determine the size and location of the one or more masks 202A-02B in the image 204 by calculating where shadow casts from the locations of the one or more individuals in the virtual environment, due to the virtual light sources 216A-16B, would fall in the virtual environment. Further illustration of this can be found in the description of FIG. 3.

In an embodiment, the partition 218 indicates a division of the image 204 between the cameras. That is, in the illustrative example depicted in FIG. 2, the plurality of projectors 212A-12B displays a 360 degree projection of the image 204 onto the dome-shaped projection surface. The portion of the image 204 to the left of the partition 218 may be projected by the first projector 212A and the portion of the image 204 to the right of the partition 218 may be projected by the second projector 212B.

Figure 3:
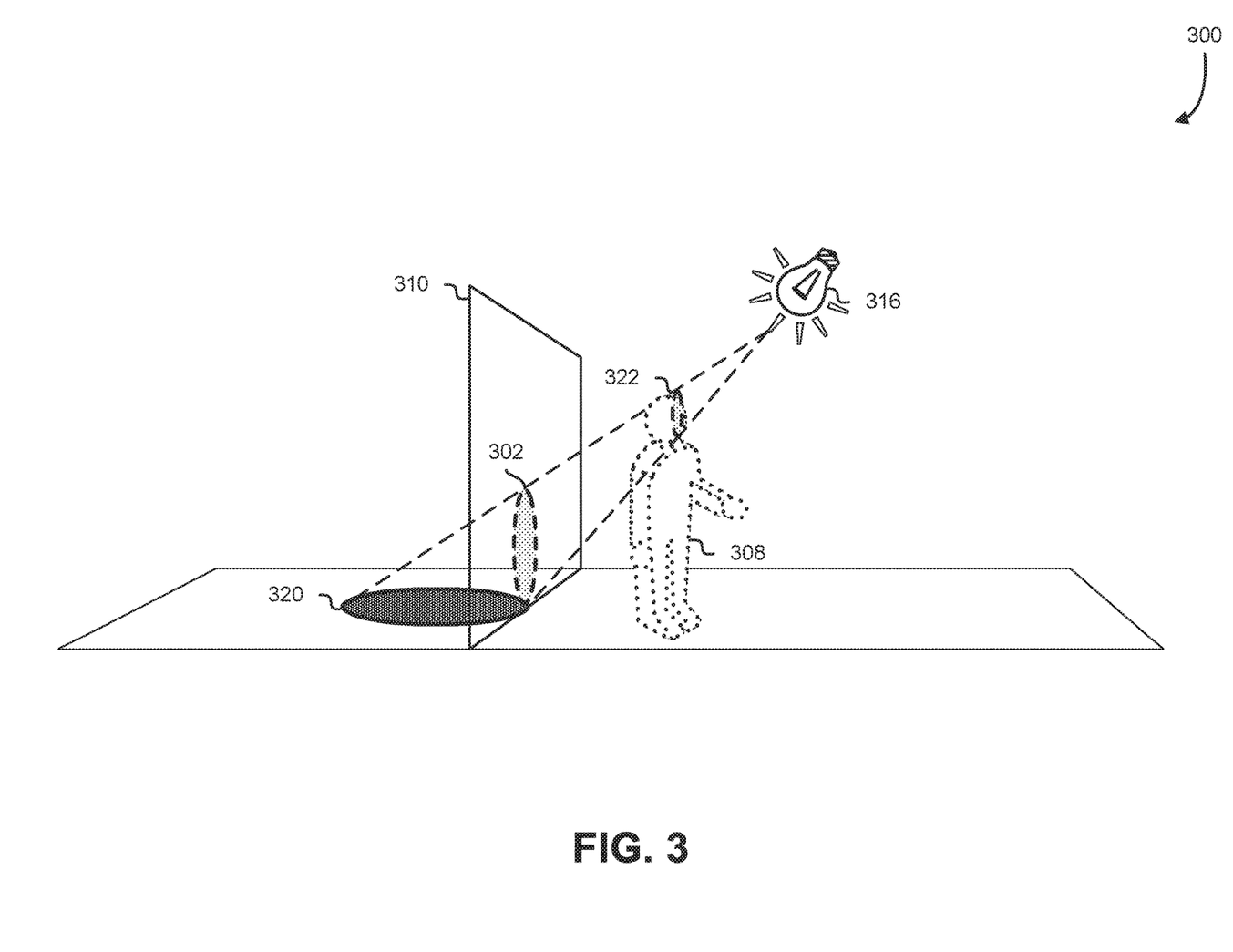
FIG. 3 illustrates an example of determining a location of a mask in an image in accordance with an embodiment.

FIG. 3 illustrates a virtual environment 300 of an embodiment of the present disclosure from which a mask 302 can be determined. Specifically, FIG. 3 depicts a virtual light source 316 that causes a shadow 320 from a location of a virtual object 322 on a virtual individual 308 to be cast in the virtual environment 300, from which the mask 302 (also referred to as a shadow mask) can be determined for an image to be projected on a physical surface.

Points in the virtual environment may correspond (i.e., be mapped) to locations in a physical space (not pictured). For example, the virtual individual 308 may be a virtual proxy for an individual, and consequently may simply be one or more points in the virtual space that correspond to points on a physical individual in a physical space, such as the individual 108 or one of the one or more individuals 208A-08B depicted in FIGS. 1 and 2 respectively. Utilizing a sensor, such as the sensor 214 of FIG. 2, to determine the location of the individual 208 in the physical space, the system of the present disclosure can determine the position of the virtual individual 308 in the virtual environment 300.

Having the position of the virtual individual 308 in the virtual environment 300, the system of the present disclosure can determine a position and orientation of the virtual object 322 in the virtual space on the virtual individual 308 (e.g., at a location over the "eyes" of the virtual individual 308) to be projected onto the physical individual. In an embodiment, virtual object 322 corresponds to the mask 302 that is a shape to be overlaid on an image to be projected on a physical surface and the physical individual.

In an embodiment, the virtual surface 310 is a shape in the virtual environment 300 that corresponds to a projection surface in the physical space to which the virtual environment 300 corresponds. For example, the virtual surface 310 may correspond to the dome-shaped projection surface 210 in FIG. 2 or the projection surface 110 in FIG. 1. Thus, the shadow 320 created by the virtual object 322 in the virtual environment 300 may be mapped to the virtual surface 310 in the manner shown in FIG. 3. The location and shape of the mask 302 on the virtual surface 310 may be used to position the mask 302 in the image to be projected (not shown) such that the mask is projected in the real space onto the equivalent location on the physical individual as the virtual object 322 is on the virtual individual 308.

In an embodiment, the virtual light source 316 is a point in the virtual environment that corresponds to a projector (not shown) in a physical space. By mapping the virtual light source to the projector in the physical space, the system can determine shadows cast by objects (e.g., the shadow 320 cast by the virtual object 322) onto the virtual environment 300 and onto the virtual surface 310. By determining the shadows, the system may determine the size and shape of the mask 302 to overlay on an image (i.e., two-dimensional representation) of the virtual environment 300 from a particular viewpoint (e.g., from the perspective of the virtual individual 308) in the virtual environment 300 to be projected by projectors onto a physical projection surface.

In an embodiment, the shadow 320 is a representation of a shadow cast by the virtual object 322 in the virtual environment 300. Note that although the shadow 320 and/or mask 302 may be black (e.g., absence of light), it is contemplated that the mask 302 may comprise a graphic (e.g., a tattoo, facial hair, clothing, etc.) to be projected onto a portion of a physical individual in a physical space. In some embodiments, the mask 302 is not necessarily black, but is the set of pixels in the image within the shape of the mask 302 having been darkened, brightened, or otherwise modified by an amount of brightness or hue. The shadow 320 may be determined using a process derived from any of a variety of techniques, which include shadow mapping/shadowing projection, shadow volume techniques, ray casting, photon mapping, or radiosity.

Figure 4:
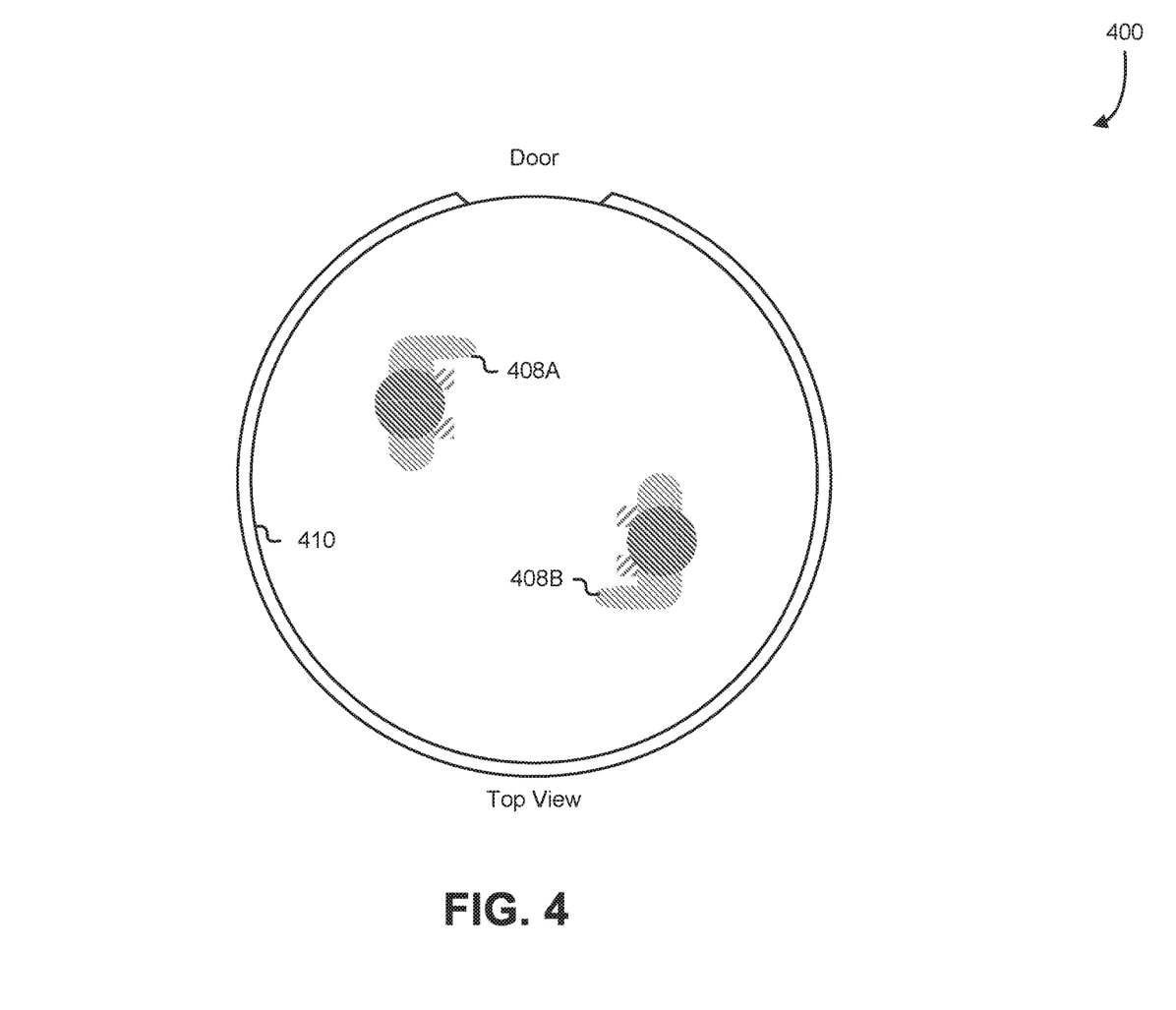
FIG. 4 illustrates an example of a view of an immersive environment from the perspective of a sensor in accordance with an embodiment.

FIG. 4 illustrates an aspect of an environment 400 in which an embodiment may be practiced. Specifically, FIG. 4 depicts a view of the environment 200 in FIG. 2 from the perspective of an overhead sensor, such as the sensor 214. In an embodiment, the individuals 408A-08B are similar to the individual 108 or the individuals 208A-08B described in conjunction with FIGS. 1 and 2 respectively. For example, the individuals 408A-08B may be players in a cooperative or competitive, immersive game being projected on the projection surface 410.

In an embodiment, the projection surface 410 is a surface upon which an image, such as the image 204 of FIG. 2 can be projected by one or more projectors, such as the projectors 212A-12B of FIG. 2. In the illustrative example shown in FIG. 4, the projection surface is located on the inner surface of a circular room occupied by the individuals 408A-08B and having a door for ingress and egress. In an embodiment, the projection surface 410 is dome-shaped. In other embodiments, the projection surface 410 is cylindrical. Although the projection surface 410 in the environment 400 is depicted as being curved, it is contemplated that techniques of the present disclosure may additionally or alternatively utilize flat projection surfaces.

As can be seen in FIG. 4, a sensor mounted at the top of the environment directed down toward the individuals 408A-08B detects the depth of portions of the individuals 408A-08B. For example, the patterns reflected from the heads of the individuals 408A-08B appear darker than patterns of the arms/torsos and feet of the individuals 408A-08B, indicating that the heads of the individuals 408A-08B are closer to the sensor than other body parts of the individuals 408A-08B. Conversely, the patterns reflected from the feet of the individuals 408A-08B are lighter than the patterns of the arms/torsos and heads of the individuals 408A-08B, indicating that the feet of the individuals 408A-08B are farther away from the sensor than the other body parts of the individuals 408A-08B. The example depicted in FIG. 4 is intended to be illustrative in nature only, and it is contemplated that other implementations may not depict or determine relative depth in the same manner as illustrated in FIG. 4.

Figure 5:
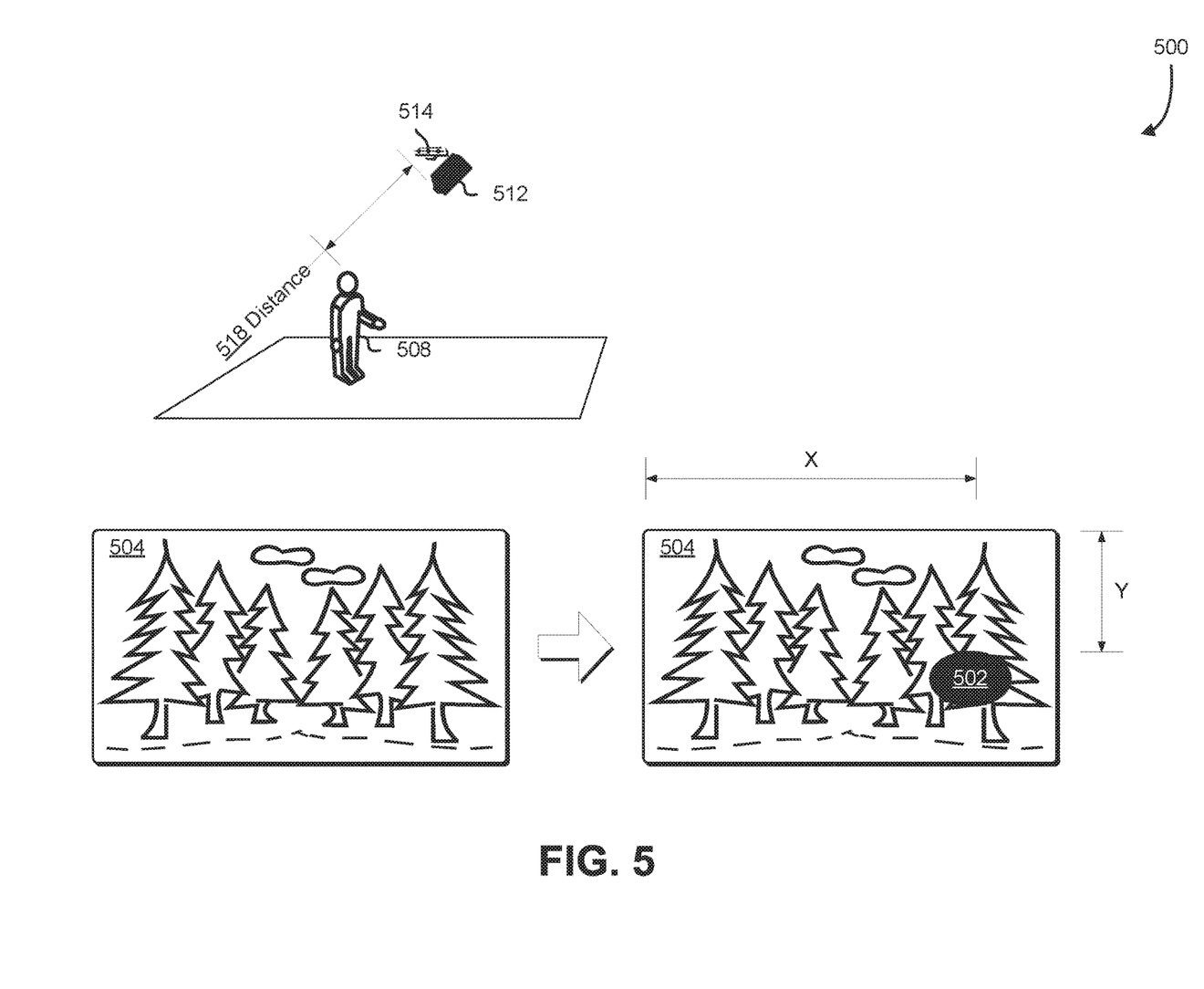
FIG. 5 illustrates an example of overlaying an image with a mask in accordance with an embodiment.

FIG. 5 illustrates an example 500 of an embodiment of the present disclosure. Specifically, FIG. 5 depicts how a sensor 514 detects a distance 518 of an individual 508 in order for the system of the present disclosure to determine where in an image 504 to overlay a mask 502. In an embodiment, the mask 502 is similar to the masks 102, 202, and 302 of FIGS. 1-3. For example the mask may be a graphic to be overlaid onto the image 504 in a location such that the overlay is projected onto a designated portion of the individual 508.

In an embodiment, the image 504 is similar to the image 104 and 204 of FIGS. 1 and 2 respectively. That is, the image 504 may be a still image frame, of potentially a sequence of images, to be projected onto a projection surface by the projector 512. In an embodiment, the individual 508 is similar to the individuals 108, 208A-08, 308, and 408A-08 of FIGS. 1-4. For example, the individual may be a human whose position intersects the projection of the projector 512.

In an embodiment, the projector 512 is a device for projecting images onto a projection surface, such as the projectors 112 and 212A-12B of FIGS. 1 and 2 respectively. In an embodiment, the sensor 514 is a device that is capable of capturing data about the environment from which a distance of at least a portion of the individual 508 is determinable. The sensor 514 may be similar to the sensors 114 and 214. For example, the sensor 514 may determine the distance 518 using a laser rangefinder, three-dimensional scanner, or a pair of image capture devices.

As depicted in the example 500, the sensor 514 detects the distance 518 of the individual 508 in a physical environment. Based on the distance 518 and the location and orientation of the projector 512, the system of the present disclosure may determine a location on the image 504 at which the mask 502 should be overlaid such that the mask 502 is projected to intersect the individual 508 in the path of projection.

Figure 6:
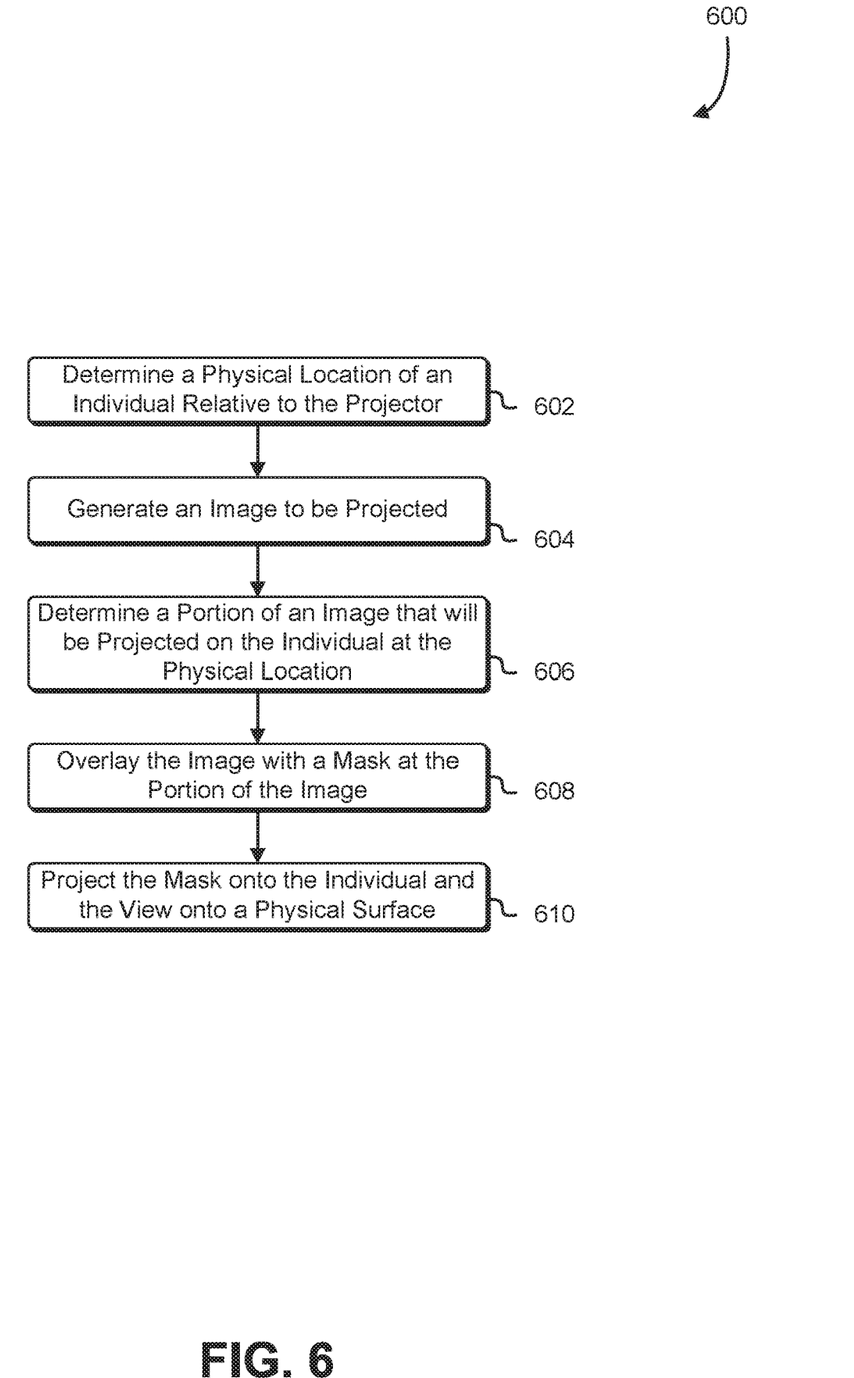
FIG. 6 is a flowchart that illustrates an example of generating and projecting a mask in accordance with an embodiment.

FIG. 6 is a flowchart illustrating an example of a process 600 for generating and projecting a mask in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 8:
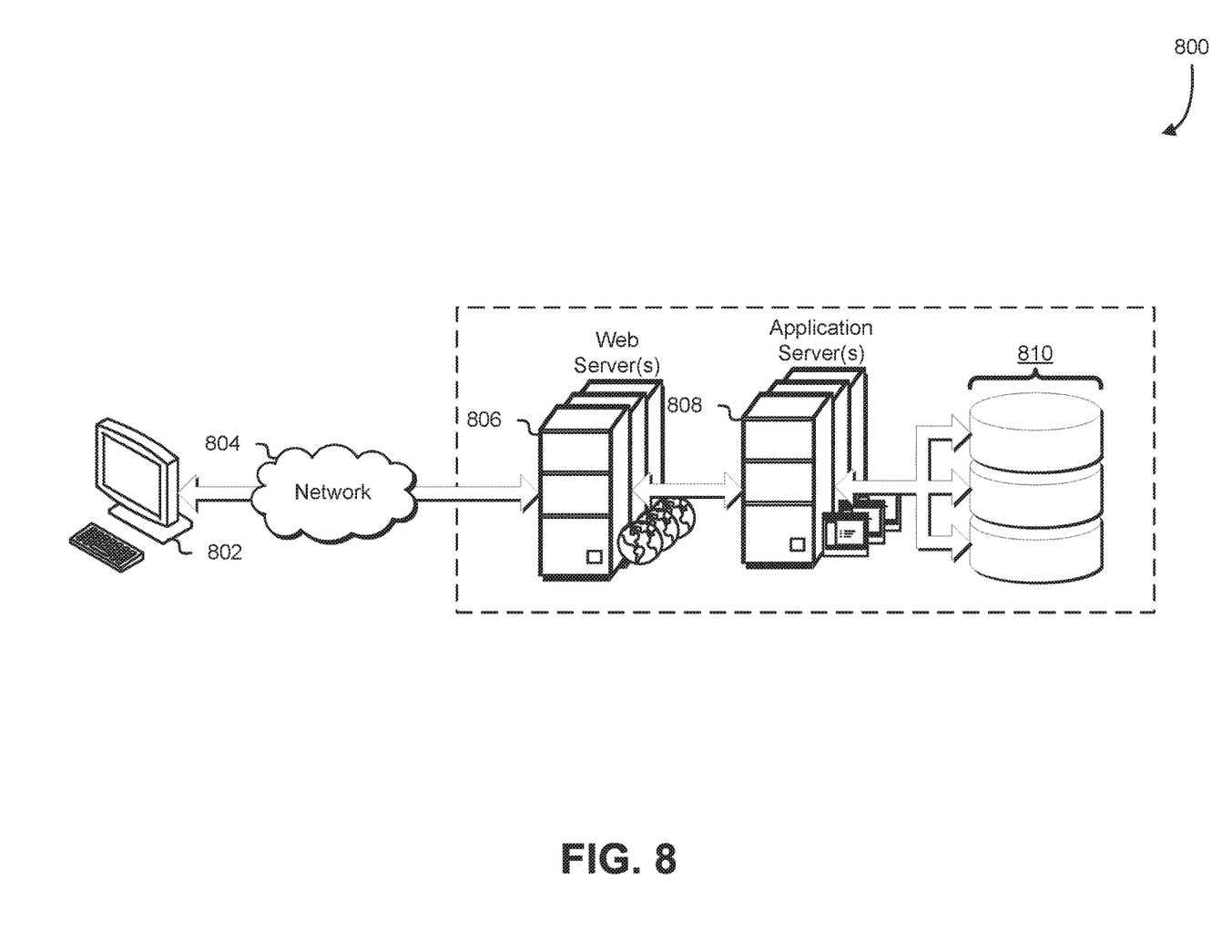
FIG. 8 illustrates an environment in which various embodiments can be implemented.

For example, some or all of process 600 may be performed by any suitable system, such as the computing system 106 of FIG. 1, a server in a data center, by various components of the environment 800 described in conjunction with FIG. 8, such as the one or more web servers 806 or the one or more application servers 808, by multiple computing devices in a distributed system of a computing resource service provider, or by any electronic client device such as the electronic client device 802. The process 600 includes a series of operations wherein a physical location of an individual is determined, a portion of an image that would be projected onto the individual at the location is determined, an image to be projected is determined, and a mask is overlaid on the portion of the image such that the mask is projected onto the individual at the location. The process 600 describes a process for projecting the mask 102 of FIG. 1.

In 602, the system performing the process 600, such as the computing system 106 of FIG. 1 determines a physical location, relative to a projector, of an individual in the path of projection between the projector and a projection surface. As described above, the physical location may be determined at least in part using a depth sensor or other sensor capable of obtaining data from which a distance of an object to the sensor may be determined. In some embodiments, the sensor may be a device (e.g., global positioning system (GPS) receiver, network triangulation or trilateration, Wi-Fi positioning device, etc.) or object (e.g., a radio-frequency identification chip/tag) attached or otherwise in contact with the individual. For example, the user may wear a helmet or wristband containing such a device, or may hold a remote controller containing such a device.

In some embodiments, the system infers the location of other parts of the individual's body based on the position and/or orientation of such a sensor in the physical space. For example, if the sensor lies at the top of the user's head (e.g., in a helmet), the system may determine that the eyes of the individual are at a certain distance and orientation from the location of the sensor in a direction based on the physical orientation of the sensor (e.g., downward if the individual and sensor are vertical versus a lateral direction if the individual's head is tilted). The system, having data that describes the position and/or orientation of the projector relative to the sensor (e.g., in coordinates in a coordinate system of the physical space that includes the individual, the sensor, and the projector), may thus calculate the location of the individual or at least a portion of the individual (e.g., a set of coordinates that corresponds to a location and/or orientation of the individual's head).

In 604, the system performing the process 600 obtains or generates an image to be projected onto a projection surface in the physical space. In some implementations, the image may be an image frame of a sequence of images comprising a video (e.g., recording, live-stream, etc.). For example, the image may be an image frame of a movie being watched by the individual or other individuals in the same physical space as the individual (e.g., the other individuals may not necessarily be in the path of projection). In other implementations, the image may be a still image (e.g., a slide presentation, image of a computing device screen/desktop, etc.). In still other implementations, the image may be an image generated to depict the view of a virtual environment from a particular viewpoint. For example, the image may be an image of a virtual gaming environment.

In 606, the system performing the process 600 determines where within the image generated or obtained in 604 a mask should be located (e.g., the mask 102 in the image 104 of FIG. 1) such that the mask is projected onto the intended portion of the individual at the location determined in 602. For example, based on coordinates of the location of at least the portion of the individual in the physical space and characteristics of the projector (e.g., distance from the location of the individual, angle of projection, etc.), the system can calculate which parts of the projected image would be projected onto the individual. Based on this information, the system may determine which portions of the image to overlay in order for the mask to intersect with the individual at the correct location (e.g., to encompass one or more of the individual's eyes). In some embodiments, the system may determine the size and shape of the mask to be large enough to compensate for any imprecisions in the determination of the location of the individual and/or for any lag time between determining the location of the individual and projection of the image during which the individual may have moved, but not so large that a portion of the mask would be projected onto the projection surface rather than onto the individual. For example, the mask may be sized to cover the eyes of the individual plus some area around the eyes of the individual to compensate for any of the aforementioned imprecision or movement.

In 608, the system performing the process 600 overlays the image generated in 604 with the mask at the position in the image determined in 606, such as shown by the manner in which the masks 102 and 502 are overlaid on the images 104 and 504 of FIGS. 1 and 5 respectively. Note that, in some implementations, the rendering of the mask in the image may be performed as the image itself is rendered without a separate overlay step (e.g., the operations of 604 and 606 may be reversed such that the position of the mask is determined before the image is generated or obtained).

In 610, the system performing the process 600 causes the image with the mask to be projected, such as by outputting the image 104 with the mask 102 to the projector 112 as shown in FIG. 1, such that the mask intersects the individual 108 in the path of projection at the location in the physical space determined in 602. In some embodiments the mask may be a black shape or some other shape with reduced brightness so as to reduce glare in the eyes of an individual from the projector. As noted above, in other implementations, the mask may project a graphical image, such as some decorative feature relevant to the game or scene being viewed by the individual (e.g., to have characteristics similar to those of characters in the game, movie, or other scene being projected). Note also that one or more of the operations performed in 602-10 may be performed in various orders and combinations, including in parallel.

Figure 7:
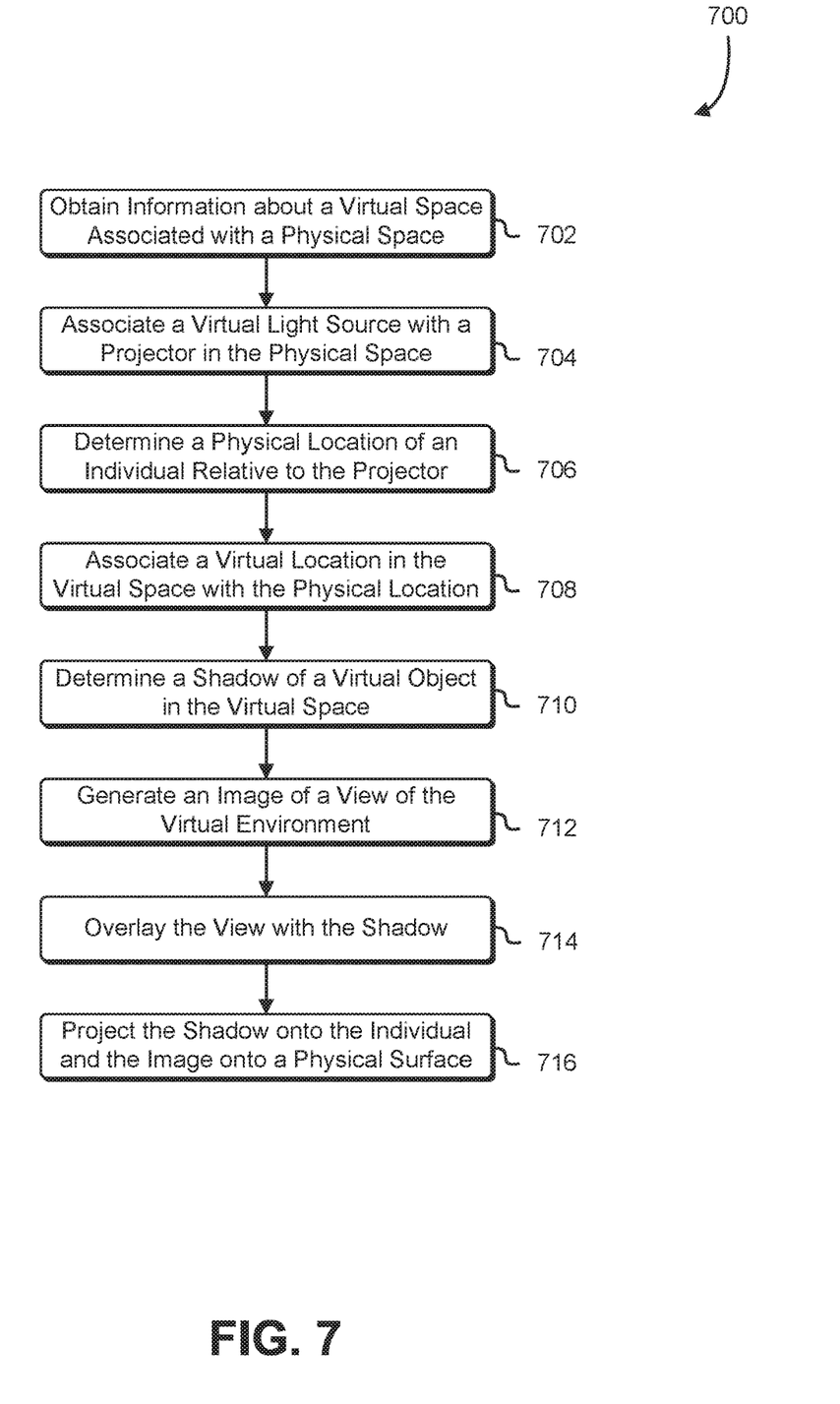
FIG. 7 is a flowchart that illustrates an example of using a shadow cast in a virtual space to determine a mask in accordance with an embodiment.

FIG. 7 is a flowchart illustrating an example of a process 700 for implementing a dynamic mask in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as the computing system 106 of FIG. 1, a server in a data center, by various components of the environment 800 described in conjunction with FIG. 8, such as the one or more web servers 806 or the one or more application servers 808, by multiple computing devices in a distributed system of a computing resource service provider, or by any electronic client device such as the electronic client device 802. The process 700 includes a series of operations wherein the system obtains information about a virtual space that is associated with a virtual space, associates a virtual light source with a projector in the physical space, detects an individual in the path of projection of the projector, and determines a mask to overlay on an image such that as the image is projected by the projector, the mask overlays at least a portion of the individual. The process 700 describes a particular manner of the process 600 of FIG. 6 using a three-dimensional virtual space, but it is contemplated that other techniques for generating and projecting a mask, such as the mask 102 or the one or more masks 202A-02B of FIGS. 1 and 2 respectively, may be used.

In 702, the system performing the process 700 may obtain information about a virtual space associated with a physical space, the information including data sufficient (e.g., a set of coordinates and/or metadata about virtual objects within a view of the virtual space from a particular viewpoint) to represent at least part of a three-dimensional (3D) environment in the virtual space. For example, a physical environment, such as the environment 200 of FIG. 2, may be associated with a virtual environment whose views are projected onto a projection surface, such as the dome-shaped projection surface 210, such that locations in the physical space also correspond to locations in the virtual space. In 702 the system may additionally or alternatively determine the mapping of real space coordinates to virtual space coordinates. It is contemplated, however, that the locations in virtual space that correspond to locations in the physical space can change. For example, if the view being projected on the projection surface is a view of motion through the virtual space (e.g., flying, riding on or in a vehicle, running, etc.), the locations in the virtual space may be updated to correspond with the motion even though the physical space itself does not move. That is, a viewer may be viewing the virtual environment as projected on the projection surface from the viewpoint of an avatar or other representation of the viewer (e.g., a set of coordinates representing the viewpoint of the viewer) in the virtual space. However, as the avatar or other representation moves or otherwise changes locations in the virtual environment, the mapping between coordinates in the real space (e.g., location of the individual viewer) to coordinates in the virtual space may likewise be updated (e.g., such that a certain point in the physical space or such that the position and/or orientation of the viewer always corresponds to the viewpoint in the virtual space). Thus, the data sufficient to represent at least part of the 3D environment in the virtual space may include information about the virtual environment sufficient to map the coordinate system of the virtual space to coordinates in the physical space. As described in the present disclosure, the physical space may include a projector, a sensor for determining distances from objects in the physical space to the projector, and an individual in the path of projection of the projector (as determined via the sensor and the projection lens angle). It is contemplated, however, that the physical space may include multiple projectors, sensors, and/or individuals.

In 704, the system performing the process 700 determines a virtual light source to correspond to the projector. That is, the virtual light source is oriented to illuminate at a corresponding direction and angle in the virtual space (e.g., as a virtual spotlight) as the projector does in the physical space. Note that the virtual light source may only be used for determining a shadow (see 710) and may not actually provide illumination in the virtual environment.

In 706, the sensor detects at least a portion of an object (e.g., head of an individual, eye of the individual, etc.) in the physical space, and the system may determine, based on the position of the sensor and the position of the projector, the location of at least the portion of the object within the physical space. For example, the sensor 214 of FIG. 2 may detect the individual 208A within the environment 200 and the system may determine where in the environment the individual is located. Having located the individual, in 708, the system performing the process 700 may associate the location in the physical space with a virtual location in the virtual space. In this manner, the system determines where at least the portion of the object (e.g., eyes of the individual) would be virtually located in the virtual space. Further details regarding this association is found in the description of FIG. 3. In some embodiments, the sensor is capable of facial and/or eye detection. In such embodiments, the system may determine not to perform the remainder of the process 700 if the individual is facing away from the projector. In other embodiments, the sensor and/or system of performing the process 700 is able to determine the approximate location of particular body parts, such as eyes, of the individual based on the position and/or orientation of another part of the individual (e.g., the individual's head). For example, the system may position the mask cover from an inch below the top of the head to two inches from the bottom of the head. If the individual is facing away for the projector, projection of the mask may still be performed (e.g., onto the back of the individual's head).

In 710, the system performing the process 700 may determine, for a particular mask that is to be projected onto the individual, a virtual object in the virtual space that corresponds to the particular mask. For example, if the particular mask is a domino mask, a virtual object in the shape of the domino mask may be positioned at the virtual location determined in 708. As another example, if the particular mask is to be an absence of projection over the full body of the individual in the physical space, a virtual object in the shape of the individual's full-body silhouette may be positioned at the virtual location determined in 708. The system may then determine the location and shape of a shadow (e.g., reverse projection) cast in the virtual space as a result of the virtual object blocking the illumination of the virtual light source of 704. Specifically, the system may determine, such as shown in FIG. 3, the location and shape of the shadow as it would be cast on a virtual surface in the virtual space corresponding to the projection surface in the physical space.

In 712, the system may generate an image of the virtual environment, such as a two-dimensional image representing the virtual environment as viewed from the perspective of the virtual location of 708. The image may be an image to be projected onto a projection surface such that an individual viewing the projection surface sees the virtual environment from the viewpoint of the virtual location 708 (e.g., the viewpoint of the virtual individual 308 of FIG. 3).

In 714, the system may overlay the image generated in 712 with a shape (e.g., set of pixels) corresponding to the shadow determined in 710. Note, in some embodiments generating the image in 712 includes rendering the shadow as well, rather than as two separate operations. The shape may be the shape of the shadow as it intersects a virtual surface in the virtual space, such as the virtual surface 310 of FIG. 3. In this manner, as the image is projected onto the projection surface in 716, the shape—as it intersects with the portion of the individual in the path of projection—forms the mask on the individual.

As described above, in some embodiments the mask is formed to the entire portion of the individual (e.g., silhouette) that is located in the path of projection. In an embodiment, the mask reduces the brightness of the projection in the silhouetted area, and, in this manner, an immersive experience may be improved by avoiding projecting the image onto the body of an individual who happens to be at least partially located in the path of projection between the projector and the projection surface. Additionally or alternatively, if the physical environment is dark, the mask projected onto the entire portion of the individual may be a solid color (e.g., white, gray, off-white, etc.) for the purpose of illuminating the individual within the physical space. Note that one or more of the operations performed in 702-16 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 800 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 8. Thus, the depiction in FIG. 8 should be taken as being illustrative in nature and not limiting to the scope of the disclosure.

The network 804 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 804 are well known and will not be discussed in detail. Communication over the network 804 can be enabled by wired or wireless connections and combinations thereof. In an embodiment, the network 804 includes the Internet and/or other publicly-addressable communications network, as the environment 800 includes one or more web servers 806 for receiving requests and serving content in response thereto, although for other networks an alternative device serving a similar purpose could be used as would be apparent to one of ordinary skill in the art.

The illustrative environment 800 includes one or more application servers 808 and data storage 810. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 808 can include any appropriate hardware, software and firmware for integrating with the data storage 810 as needed to execute aspects of one or more applications for the electronic client device 802, handling some or all of the data access and business logic for an application. The one or more application servers 808 may provide access control services in cooperation with the data storage 810 and is able to generate content including, text, graphics, audio, video, and/or other content usable to be provided to the user, which may be served to the user by the one or more web servers 806 in the form of HyperText Markup Language (HTML), Extensible Markup Language (XML), JavaScript, Cascading Style Sheets (CS S), JavaScript Object Notation (JSON), and/or another appropriate client-side structured language. Content transferred to the electronic client device 802 may be processed by the electronic client device 802 to provide the content in one or more forms including forms that are perceptible to the user audibly, visually, and/or through other senses. The handling of all requests and responses, as well as the delivery of content between the electronic client device 802 and the one or more application servers 808, can be handled by the one or more web servers 806 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 810 can include several separate data tables, databases, data documents, dynamic data storage schemes, and/or other data storage mechanisms and media for storing data relating to a particular aspect of the present disclosure. For example, the data storage 810 may include mechanisms for storing various types of data and user information 816, which can be used to serve content to the electronic client device 802. The data storage 810 also is shown to include a mechanism for storing log data, such as application logs, system logs, access logs, and/or various other event logs, which can be used for reporting, analysis, or other purposes. It should be understood that there can be many other aspects that may need to be stored in the data storage 810, such as page image information and access rights information, which can be stored in any of the above listed mechanisms as appropriate or in additional mechanisms in the data storage 810. The data storage 810 is operable, through logic associated therewith, to receive instructions from the one or more application servers 808 and obtain, update, or otherwise process data in response thereto. The one or more application servers 808 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 808.

In one embodiment, a user, through a device operated by the user, can submit a search request for a match to a particular search term. In this embodiment, the data storage 810 might access the user information to verify the identity of the user and obtain information about items of that type. The information then can be returned to the user, such as in a results listing on a web page that the user is able to view via a browser on the electronic client device 802. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 804. These devices also can include virtual devices such as virtual machines, hypervisors, and other virtual devices capable of communicating via the network 804.

Various embodiments of the present disclosure utilize the network 804 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 804 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 806, the one or more web servers 806 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 800 can include a variety of data stores and other memory and storage media as discussed above. These can reside in a variety of locations, such as on a storage medium local to (and/or resident in) one or more of the computers or remote from any or all of the computers across the network 804. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    obtaining data sufficient to represent at least part of a three-dimensional environment in virtual space, coordinates in the three-dimensional environment having a correspondence to coordinates in a physical environment in a physical space;
    associating a virtual light source in the three-dimensional environment with a projector in the physical environment, the physical environment including a projection surface;
    determining, based on sensor data from a sensor in the physical space, a physical location of an eye of an individual in the physical environment, the individual being in a path of projection of the projector;
    associating a virtual location in the three-dimensional environment with the physical location;
    determining, based on a virtual object at the virtual location blocking at least a portion of the virtual light source, a shadow of the virtual object at a location in the three-dimensional environment that corresponds to the projection surface in the physical environment;
    generating an image of the three-dimensional environment, a portion of the image corresponding to the shadow; and
    causing the projector to project the image onto the individual and the projection surface such that the portion of the image that corresponds to the shadow is projected at the physical location of the eye of the individual.

2. The computer-implemented method of claim 1, wherein the projection surface is a dome-shaped projection surface.

3. The computer-implemented method of claim 1, wherein the sensor is a depth sensor.

4. The computer-implemented method of claim 1, wherein generating the image includes modifying the image to reduce a brightness of pixels within the portion of the image that corresponds to the shadow.

5. A system, comprising:
    one or more processors; and
    memory including executable instructions that, if executed by the one or more processors, cause the system to:
        determine a physical location associated with an individual at least partially located between a projector and a projection surface;
        determine a virtual location corresponding to an avatar of the individual in a virtual environment;
        determine a virtual position of a virtual light source in the virtual environment that corresponds to the projector;
        determine a region in the virtual environment based at least in part on:
            the virtual position of the virtual light source; and
            a virtual object at the virtual location;

modify an image to be projected by the projector onto the projection surface to include a predetermined graphical effect in a portion of the image that corresponds to the region; and cause, as a result of the image including the portion modified being provided to the projector, projection of the portion of the image modified to intersect with the physical location associated with the individual.

6. The system of claim 5, wherein the projection surface is curved.

7. The system of claim 5, wherein the image is a two-dimensional representation of the virtual environment.

8. The system of claim 7, wherein the virtual environment is an environment of an interactive video game.

9. The system of claim 5, wherein the physical location associated with the individual corresponds to a part of a body of the individual.

10. The system of claim 9, wherein the part of the body includes an eye of the individual.

11. The system of claim 5, wherein the executable instructions that cause the system to determine the region further include instructions that cause the system to determine, based at least in part on a virtual object at the virtual location, the region in the virtual environment affected by the virtual object blocking the virtual light source.

12. The system of claim 11, wherein the executable instructions, if executed by the one or more processors, further cause the system to determine, based on the virtual object blocking the virtual light source, a shadow cast by the virtual object.

13. A non-transitory computer-readable storage medium having stored thereon executable instructions that, if executed by one or more processors of a computer system, cause the computer system to at least:

determine, based on sensor data from a sensor in a physical environment, a physical location of at least a portion of an individual in the physical environment, the individual being at least partially located between a projector and a projection surface;

determine a virtual location in a virtual environment, the virtual location corresponding to an avatar of the individual in the virtual environment, the virtual location having a correspondence to the physical location of the at least a portion of the individual in the physical environment;

determine, based on a virtual object at the virtual location blocking at least a portion of a virtual light source, a shadow cast by the virtual object;

modify, based on the shadow, an image of the virtual environment to be projected by the projector onto the projection surface; and cause the projector to project the image, whereby a portion of the image that corresponds to the shadow is projected onto at least the portion of the individual.

14. The non-transitory computer-readable storage medium of claim 13, wherein the sensor is physically attached to the individual at a location relative to the portion of the individual onto which the portion of the image is to be projected.

15. The non-transitory computer-readable storage medium of claim 13, wherein the portion of the image is a graphical design.

16. The non-transitory computer-readable storage medium of claim 13, wherein the portion of the individual is a full-body silhouette of the individual.

17. The non-transitory computer-readable storage medium of claim 13, wherein:

the executable instructions further include instructions that cause the computer system to obtain information about the virtual environment sufficient to map a coordinate system of the virtual environment to coordinates in the physical environment; and the executable instructions that cause the computer system to determine the shadow of the virtual object include instructions that cause the computer system to determine, based on the information, the virtual location corresponding to the physical location.

18. The non-transitory computer-readable storage medium of claim 13, wherein the projection surface is flat.

19. The non-transitory computer-readable storage medium of claim 13, wherein the virtual light source in the virtual environment corresponds to the projector in the physical environment.

20. The non-transitory computer-readable storage medium of claim 13, wherein the executable instructions that cause the computer system to modify the image include instructions that cause the computer system to reduce a brightness of pixels in the image that correspond to the shadow of the virtual object.

* * * * *